United States Patent
Hashimoto et al.

(10) Patent No.: US 6,684,131 B2
(45) Date of Patent: Jan. 27, 2004

(54) DEVICE AND METHOD FOR CONTROLLING ROBOT

(75) Inventors: Atsumi Hashimoto, Osaka (JP); Takashi Nakatsuka, Hyogo (JP); Masahiro Ohto, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 10/183,897

(22) Filed: Jun. 25, 2002

(65) Prior Publication Data

US 2003/0014156 A1 Jan. 16, 2003

(30) Foreign Application Priority Data

Jun. 25, 2001 (JP) .................................... 2001-190960

(51) Int. Cl.$^7$ .............................................. G06F 19/00
(52) U.S. Cl. ...................... 700/245; 700/179; 700/181; 700/214; 700/256; 700/264; 318/568.1; 318/568.23; 318/569; 318/571; 360/92
(58) Field of Search ................................. 700/245, 214, 700/179, 181, 256, 264; 360/92; 318/568.23, 568.1, 569, 571

(56) References Cited

U.S. PATENT DOCUMENTS

| | | | | |
|---|---|---|---|---|
| 4,534,001 A | * | 8/1985 | Nozawa et al. ............. | 700/181 |
| 5,043,644 A | * | 8/1991 | Sasaki et al. ........... | 318/568.23 |
| 5,465,605 A | * | 11/1995 | Smith et al. ...................... | 73/7 |
| 6,356,806 B1 | * | 3/2002 | Grob et al. .................. | 700/245 |
| 6,386,116 B1 | * | 11/2002 | Ostwald et al. ............. | 700/251 |

FOREIGN PATENT DOCUMENTS

JP 6-19528 1/1994

OTHER PUBLICATIONS

Iba, Robot programming through multi-modal interaction, 2001, Internet, pp. 1-29.*

* cited by examiner

Primary Examiner—William A. Cuchlinski, Jr.
Assistant Examiner—Marc McDieunel
(74) Attorney, Agent, or Firm—RatnerPrestia

(57) ABSTRACT

A robot controller capable of minimizing an increase in the tact time during work, reducing changes in joint axes of the robot, thereby providing the structure with long mechanical life. The robot controller i) stores a plurality of movement data formed of amount and time for movement; ii) checks whether a movement of a robot has acceleration exceeding a predetermined level by calculation on the basis of the stored movement data; iii) increases the time for movement of the corresponding movement data, the preceding and following data to the movement data, if the calculation indicates over-acceleration; and iv) controls the robot according to the time-increased movement data.

7 Claims, 9 Drawing Sheets

DEVICE AND METHOD FOR CONTROLLING ROBOT

FIELD OF THE INVENTION

The present invention relates to a device and method for controlling movements of a robot.

BACKGROUND OF THE INVENTION

In operating a manipulator of a robot on the basis of teaching point data, interpolation between the teaching points is usually obtained through the steps described below:

i) determining an interpolation point on the Cartesian space at time intervals;

ii) inversely converting the interpolation point to an interpolation point on the joint space;

iii) according to the interpolation point on the joint space, generating movement data formed of an amount of movement between adjacent interpolation points on the joint space and the time required for movement; and iv) providing the movement data as instructions to a motor responsible for operating an articulated manipulator of a robot.

However, such articulated robot whose motion is controlled by interpolation cannot always move joint axes at a constant velocity on the joint space, when the tip of the manipulator moves at a constant velocity on the Cartesian space. In particular, movement passing by a singular point can cause a sudden change in velocity of the joint axes. Such abrupt changes in velocity can overload mechanical components including reduction gears forming the joint axes, inviting short mechanical life.

To avoid the problem, it becomes necessary to correct teaching point data so as to lower the velocity of the joint axes to a permissible level. The re-teaching work, however, takes much expense in time and effort of a teaching operator.

As a remedy for the inconvenience, a method introduced in Japanese Patent Application Non-Examined Publication No. H 6-19528 suggests the steps below:

i) obtaining all of movement data for joint axes corresponding to the range between a pair of teaching points;

ii) checking the velocity of the joint axes according to the movement data;

iii) if inadmissible changes in velocity is observed, reducing the velocity of the manipulator's tip on the Cartesian space, and then a fresh-interpolating the pair of teaching points.

These steps control the change in velocity of the joint axes down to within a permissible value, allowing the tip of the manipulator moves with an automatically controlled velocity. With the method, however, such uniform reduction in velocity between teaching points affects on data having a velocity with no need for slowdown, inviting undesired increase in tact time during operation.

SUMMARY OF THE INVENTION

It is therefore the object of the present invention to provide a robot controller capable of driving joint axes at a steady velocity, offering an efficient tact time during operation. According to the present invention, the controller i) stores a series of movement data formed of the amount of movement and the time required for movement; ii) checks whether a movement of a robot has acceleration exceeding a predetermined level according to the stored movement data; iii) increases the time for movement of the corresponding movement data, the preceding data, and the following data, if the movement has acceleration exceeding the permissible level; and iv) controls the robot on the basis of the time-increased movement data. Performing the steps selectively slows down the movement having an acceleration exceeding the permissible level. As a result, undesired change in an acceleration of the joint axes will be lessened, with an increase in the tact time minimized.

DESCRIPTION OF THE PREFERRED EMBODIMENTS

The preferred embodiments of the present invention are described hereinafter with reference to the accompanying drawings, wherein like reference marks indicate like parts throughout the figures.

First Preferred Embodiment

Figure 1:
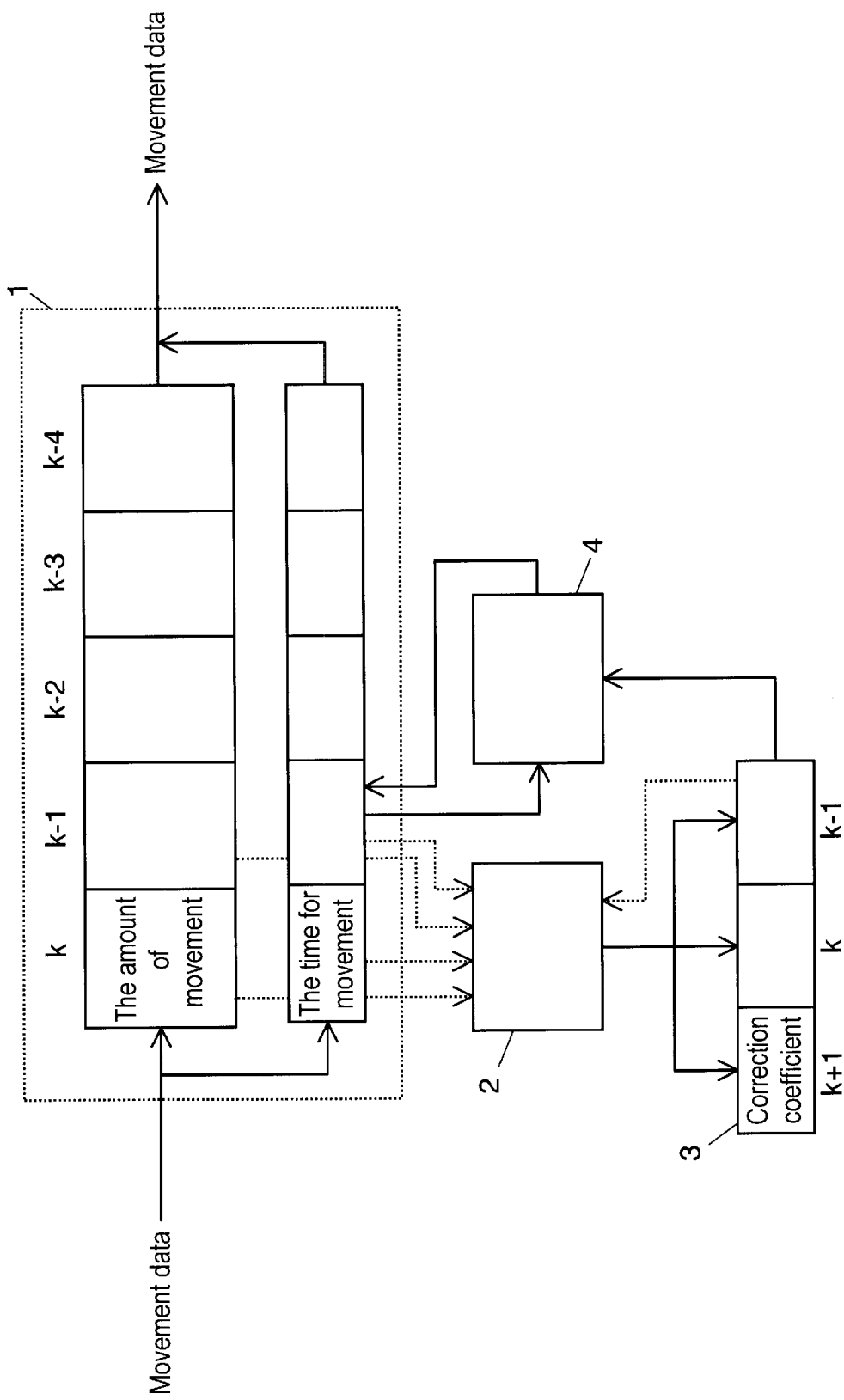
FIG. 1 is a block diagram of a robot controller in accordance with a first preferred embodiment of the present invention.
Figure 2:
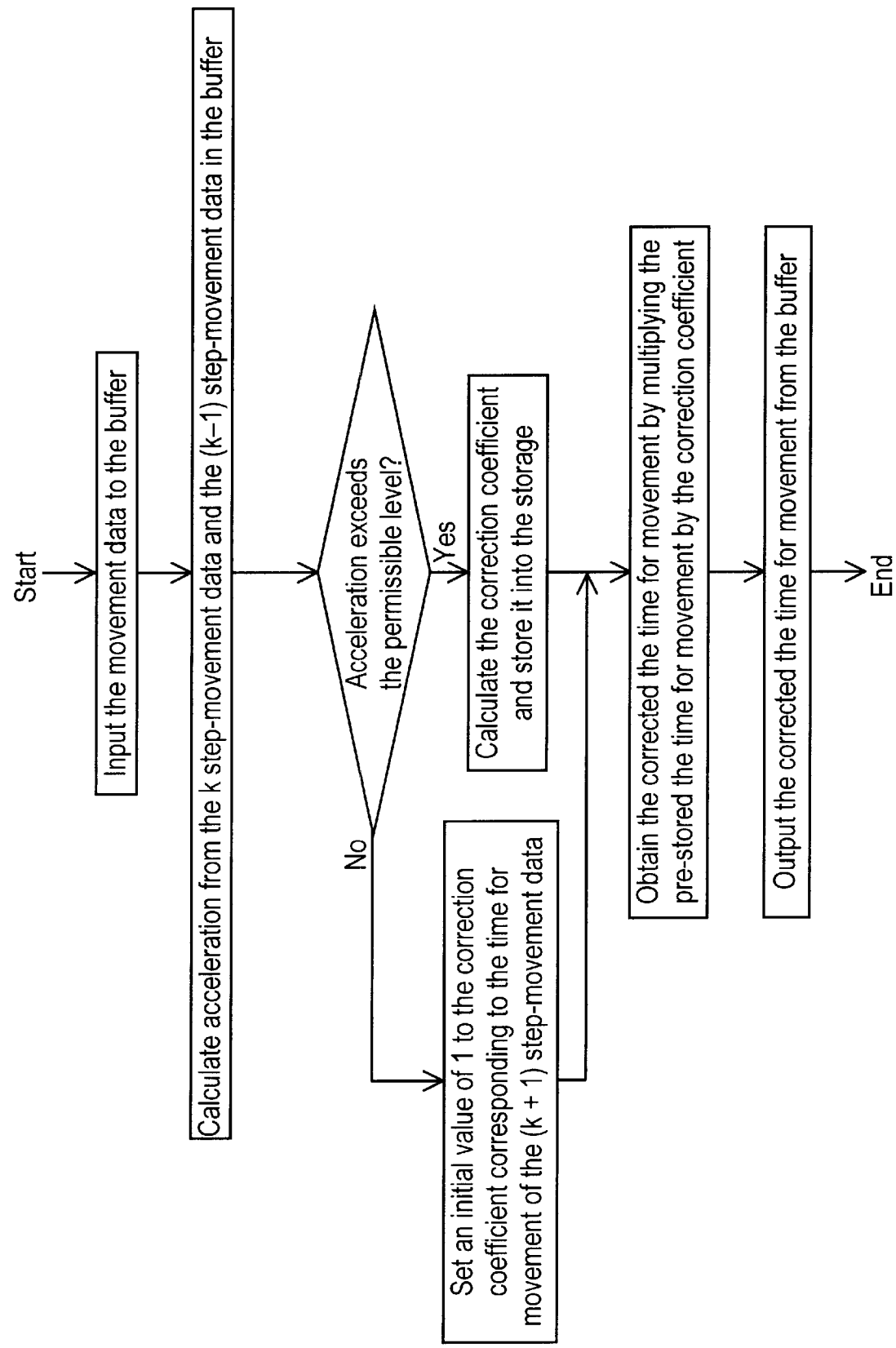
FIG. 2 is a flow chart indicating the routine of a controlling method in accordance with the first preferred embodiment.

FIG. 1 is a block diagram showing the structure of a robot controller in accordance with the first preferred embodiment. The explanation of the embodiment will be given with reference to FIG. 1 and a flow chart shown in FIG. 2.

Movement data, as shown in FIG. 1, is stored in a buffer in movement data-storage 1. The movement data consists of the amount of movement of each joint axis, and the time required for movement of the axes. The buffer in storage 1 retains movement data of several steps of movement. The k step in the buffer has the latest movement data. Therefore, the (k−4) step in FIG. 1 has the movement data associated with the step four-steps before the k step, which is the oldest data in the buffer. The movement data is fed out from the buffer in sequence to control continuous movement of joint axes of a robot. Hereinafter, movement data stored in (k−n) step of the buffer (where n takes on 1 through 4) is referred to as "n step(s)-before" movement data.

Calculator 2 calculates acceleration according to the latest movement data and the one-step-before movement data. According to the calculated acceleration, calculator 2 further calculates a correction coefficient and stores the result in correction coefficient-storage 3. On the other hand, calculator 4 calculates the product of the correction coefficient handed from storage 3 and the time for movement corresponding to the one-step-before movement data. The time for movement corresponding to the one-step-before movement data, which is previously stored in the buffer in storage 1, is now replaced with the product as a corrected movement data. Movement data is thus corrected and fed out from the buffer in sequence.

In the process above, each correction coefficient stored in storage 3 has a rightward shift each time new movement data is fed into storage 1. The correction coefficient fed out from the storage 3 by the shift is used for the calculation in calculator 4 and then discarded. In the process, correction coefficient β that is associated with the movement data following the k step, i.e., correction coefficient β(k+1) has an initial value of 1.

Now will be described how calculator 2 calculates the acceleration and correction coefficient.

Figure 9A:
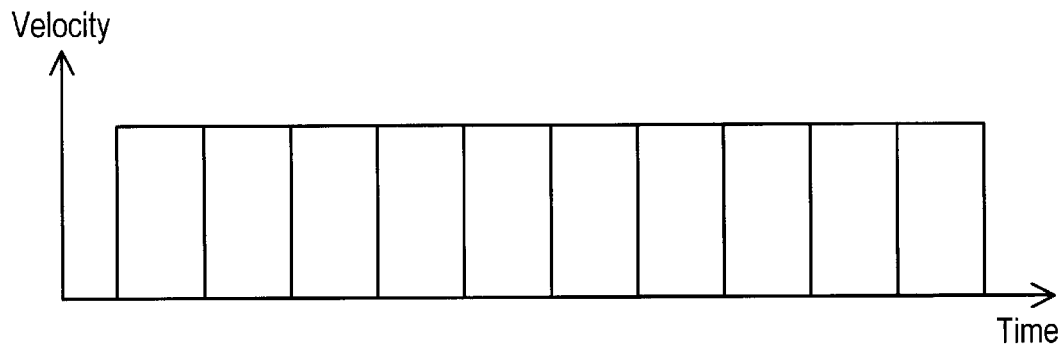
FIGS. 9(*a*)–(*c*) show an example of movement data obtained from joint axes in accordance with the embodiments of the present invention.
Figure 9B:
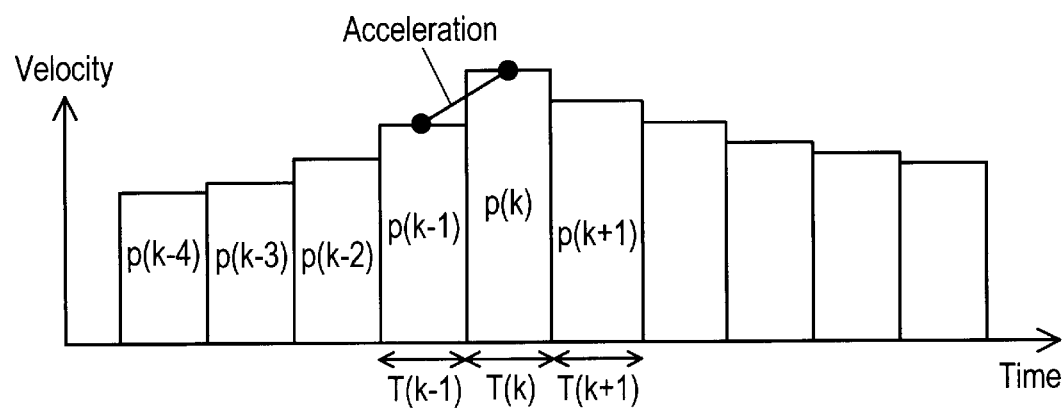
Figure 9C:
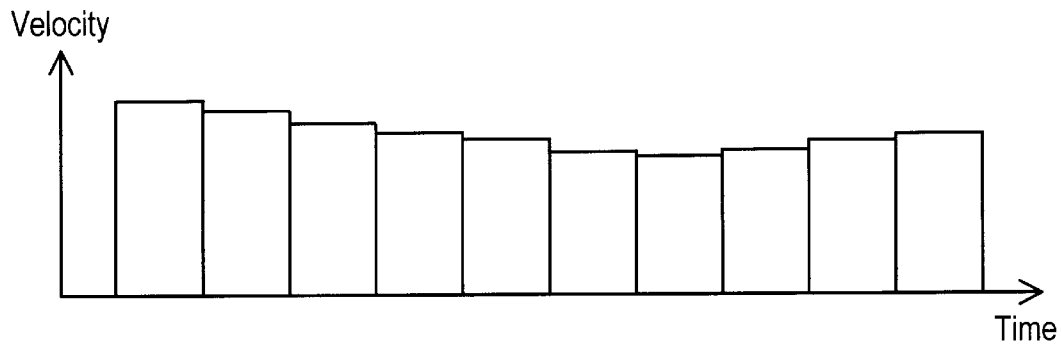

FIG. 9A is a chart illustrating changes in velocity at the manipulator's tip, with the velocity of the manipulator's tip taken on the vertical axis and a lapse of time taken on the horizontal axis. It is apparent from the chart that the tip of the manipulator moves at a constant velocity at any given time, that is, at any given step in the process. On the other hand, FIG. 9B illustrates changes in velocity of the tip of the manipulator in the direction of joint axis p; similarly, FIG. 9C illustrates changes in velocity in the direction of joint axis q. The tip of the manipulator gains a resultant velocity as a vector sum in the three directions of joint axes p, q, and r (not shown). That is, the velocity in the direction of each joint axis varies, even if the velocity at the tip of the manipulator is kept constant.

In FIG. 9B, p(k) and T(k) represent an amount of movement and the time required for movement, respectively, in the direction of joint axis p in the k step.

Now suppose that acceleration α(k) indicates acceleration gained between the movement data in the k step and the movement data in the (k−1) step in the direction of joint axis p. Acceleration α(k) is given by Equation 1 below.

$$\alpha(k) \times 2 \times C = \{p(k)/T(k) - p(k-1)/T(k-1)\}/\{T(k)+T(k-1)\}, \quad \text{Eq. 1}$$

where C takes on a constant.

Acceleration in the direction of axis q is obtained by replacing p(k) in Eq. 1 with q(k), which represents an amount of movement in the direction of axis q. Similarly, substituting r(k), instead of q(k), into Eq. 1 provides an amount of movement in the direction of axis r.

Now suppose that αLim indicates maximum permissible acceleration. Value b(k) in Eq. 2 is calculated from α(k) derived from Eq. 1 and αLim.

$$b(k) = \alpha(k)/\alpha Lim. \quad \text{Eq. 2}$$

Similarly, substituting α(k) acquired for axes q and r into Eq. 2 yields another two values of b(k): one is for axis q, and the other is for axis r. Suppose that B(k) takes on the largest value in the three values of b(k). If B(k) is equal to 1 or smaller, correction coefficient β(k) is obtained from Eq. 3; otherwise, coefficient β(k) is obtained from Eq. 4.

$$\beta(k) = 1. \quad \text{Eq. 3}$$

$$\beta(k) = \sqrt{B(k)}. \quad \text{Eq. 4}$$

That is, if each α(k) takes on a value within the maximum permissible acceleration, calculator 2 employs Eq. 3: no correction is given to T(k), i.e., the time for movement stored in the k step, and correction coefficient β(k−1) has rightward-shift with no replacement.

On the other hand, if one of α(k) is greater than the value of the maximum permissible level, calculator 2 employs Eq. 4: correction coefficient β(k) takes on the square root of the ratio of α(k), which is derived from Eq. 1, to the maximum permissible acceleration. In addition, both of correction coefficient β(k−1) and coefficient β(k+1) take on the value the same as coefficient β(k).

That is, $$\beta(k-1) = \beta(k+1) = \beta(k). \quad \text{Eq. 5}$$

Such derived β(k), β(k−1), and β(k+1) are stored in storage 3 and used for correction of the time for movement in calculator 4.

Calculator 4 corrects the time for movement only: no correction is given to the amount of movement. This can slow down the acceleration to the maximum permissible level, without sacrificing required amount of movement even in the steps having acceleration beyond the maximum permissible level.

Second Preferred Embodiment

Figure 3:
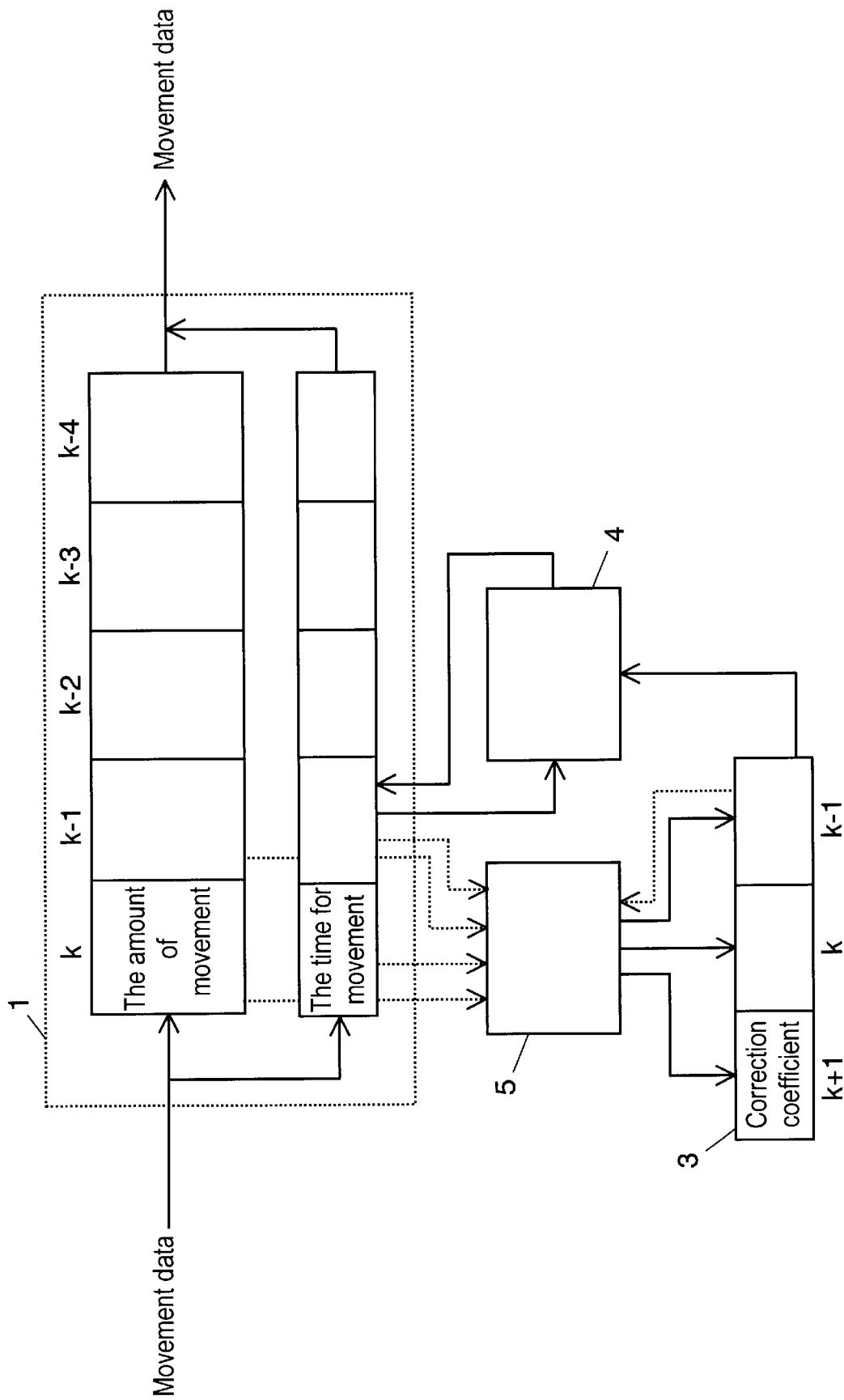
FIG. 3 is a block diagram of a robot controller in accordance with a second preferred embodiment.
Figure 4:
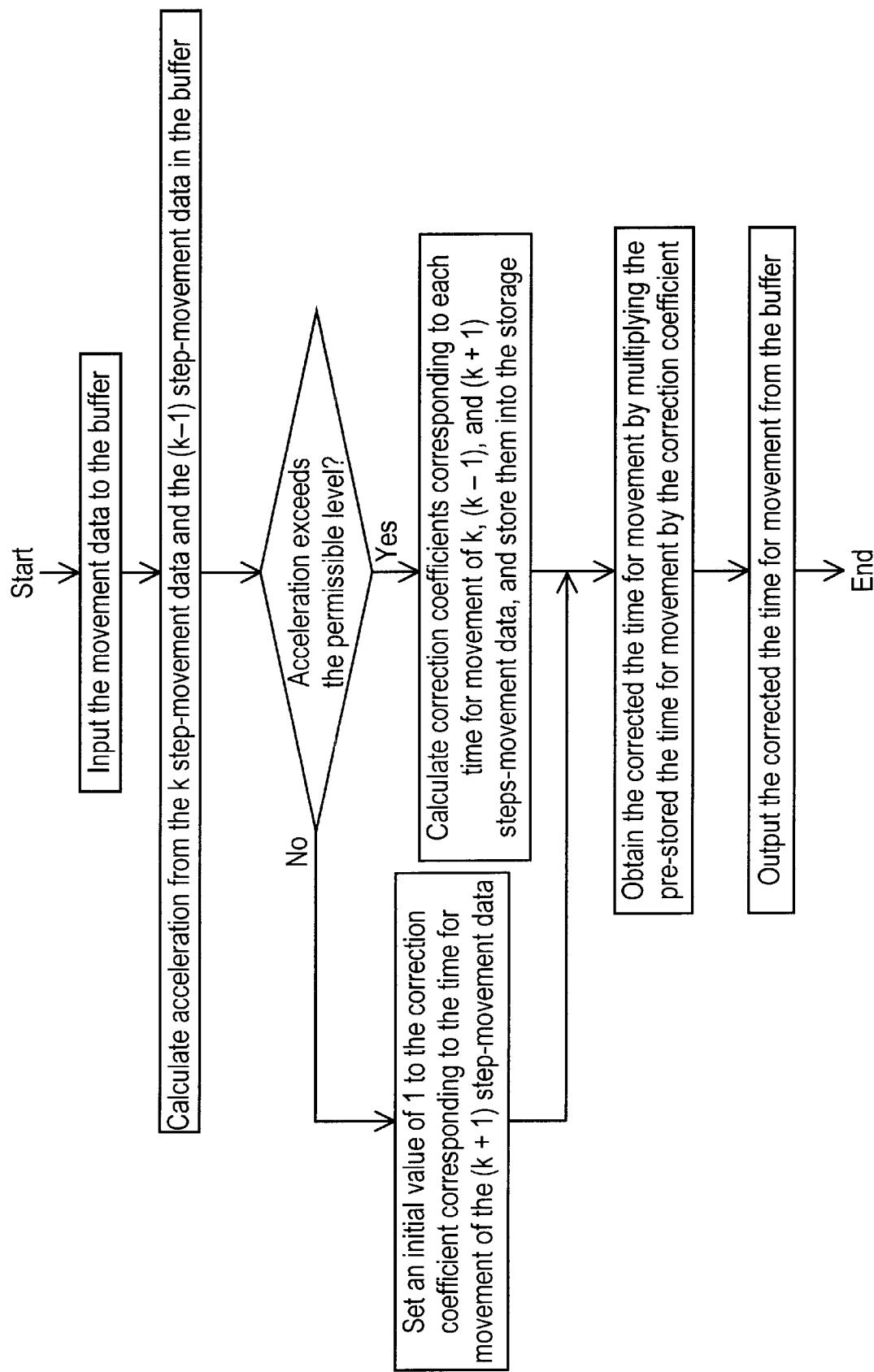
FIG. 4 is a flow chart indicating the routine of a controlling method in accordance with the second preferred embodiment.

FIG. 3 is a block diagram of a robot controller in accordance with the second preferred embodiment. The explanation of the embodiment will be given with reference to FIG. 3 and a flow chart shown in FIG. 4.

The sole difference is in that the structure of the embodiment contains calculator 5, instead of calculator 2 in the first preferred embodiment. Calculator 5 performs calculation so that correction coefficients β(k−1) and β(k+1) take on values smaller than the value of coefficient β(k). Calculator 5 provides not only the calculation above, but also calculation similar to that done by calculator 2 in the first preferred embodiment.

Here will be described an example of how to derive the correction coefficient.

If the joint axes have acceleration beyond the permissible level, calculator 5 employs Eq. 6 and Eq. 7 for calculation of correction coefficients β(k−1) and β(k+1), respectively.

$$\beta(k-1) = 1 + \gamma 1\{\beta(k) - 1\}, \quad \text{Eq. 6}$$

$$\beta(k+1) = 1 + \gamma 2\{\beta(k) - 1\}, \quad \text{Eq. 7}$$

where 0<γ1<1, 0<γ2<1.

Calculator 4 uses the correction coefficients obtained above to correct the time for movement, with the amount of movement provided no correction. This allows the k step having acceleration beyond the maximum permissible level to slow down the acceleration to the permissible level, whereas allows the (k−1) step and (k+1) step to have a "less strict" slowdown. The correction allows the tip of the manipulator to have smoothly curved variations in velocity; at the same time, it reduces variations in velocity of joint axes.

As described earlier, although calculator 5 not only calculates correction coefficients γ(k−1) and γ(k+1), but also performs the calculation similar to that done by calculator 2 in the first preferred embodiment, it is not limited to: the structure may contain another calculator that takes on the task of calculator 2. In this case, following the completion of the calculation in the added calculator, calculator 5 calculates the correction coefficients.

Third Preferred Embodiment

Figure 5:
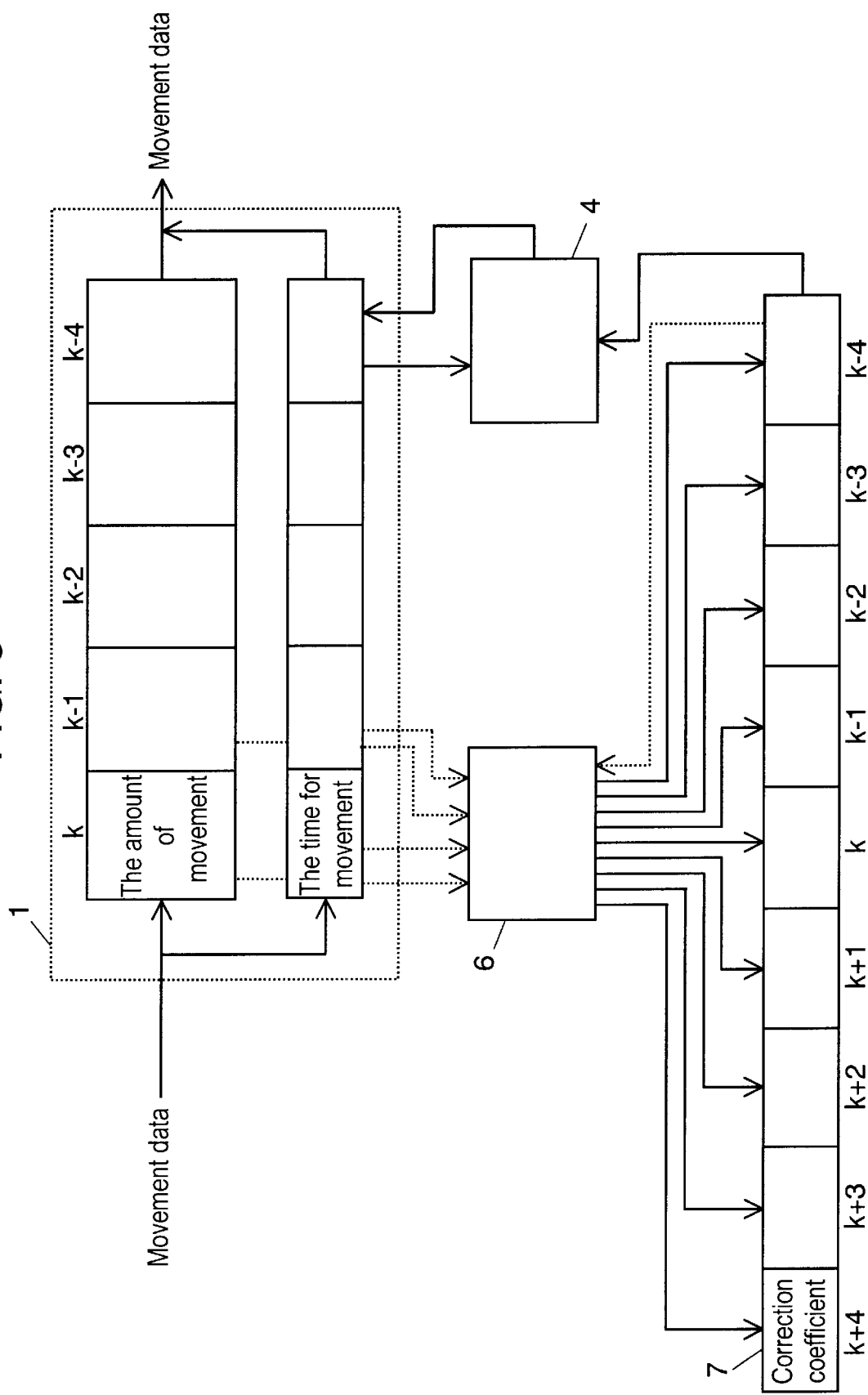
FIG. 5 is a block diagram of a robot controller in accordance with a third preferred embodiment.
Figure 6:
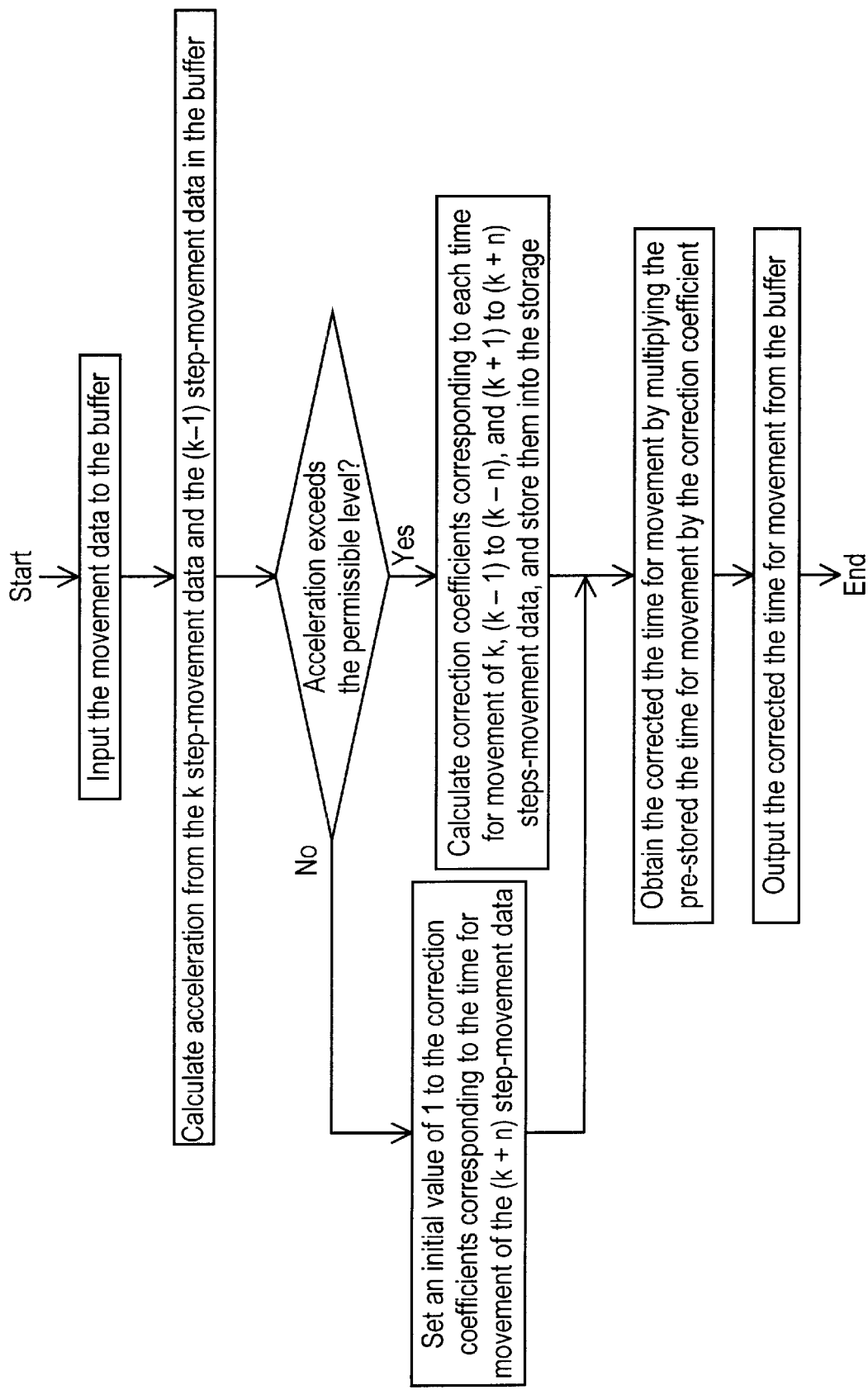
FIG. 6 is a flow chart indicating the routine of a controlling method in accordance with the third preferred embodiment.

FIG. 5 is a block diagram of a robot controller in accordance with the third preferred embodiment. The explanation of the embodiment will be given with reference to FIG. 5 and a flow chart shown in FIG. 6.

The embodiment differs from the first preferred embodiment in that calculator 6 and correction coefficient-storage 7 are disposed in the structure. Calculator 6 extensively calculates from the correction coefficient corresponding to n-step(s)-before movement data, i.e., coefficient β(k−n) to the correction coefficient corresponding to n-step(s)-after movement data, i.e., coefficient β(k+n); where n takes on 1 to 4. Calculator 6 provides a calculation so that a coefficient gets smaller as n gets larger. Calculator 6 also performs the calculation similar to that done by calculator 2 in the first preferred embodiment. Storage 7 stores the coefficients handed from calculator 6 and outputs them in sequence to calculator 4 where the time for movement is corrected.

The correction allows the tip of the manipulator to have smoothly curved variations in velocity over extensive steps; at the same time, it reduces variations in velocity of joint axes.

Although calculator 5 not only calculates from correction coefficients β(k−n) to β(k+n), but also performs the calculation similar to that done by calculator 2 in the first preferred embodiment, it is not limited to: the structure may contain another calculator that takes on the task of calculator 2.

Fourth Preferred Embodiment

Figure 7:
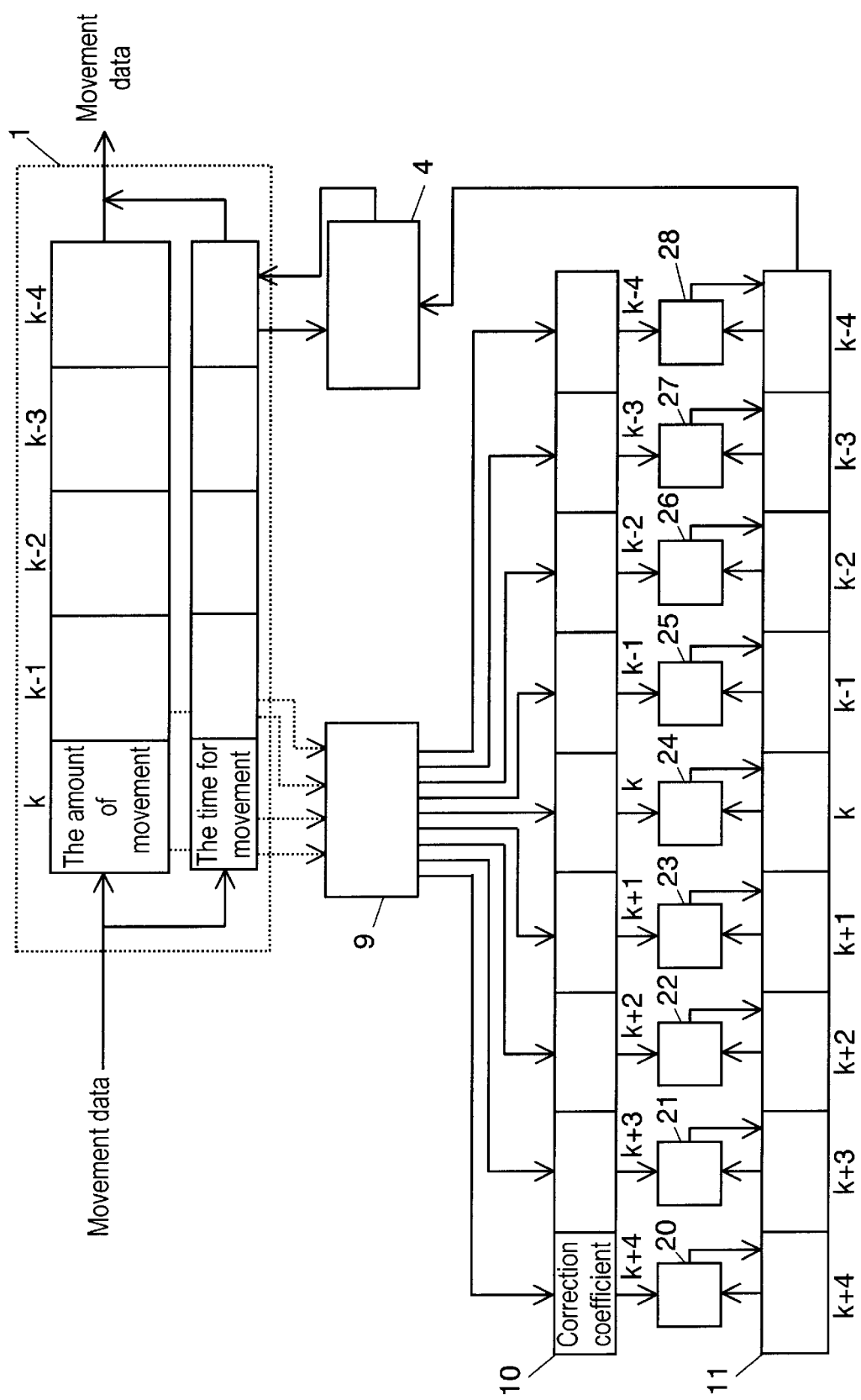
FIG. 7 is a block diagram of a robot controller in accordance with a fourth preferred embodiment.
Figure 8:
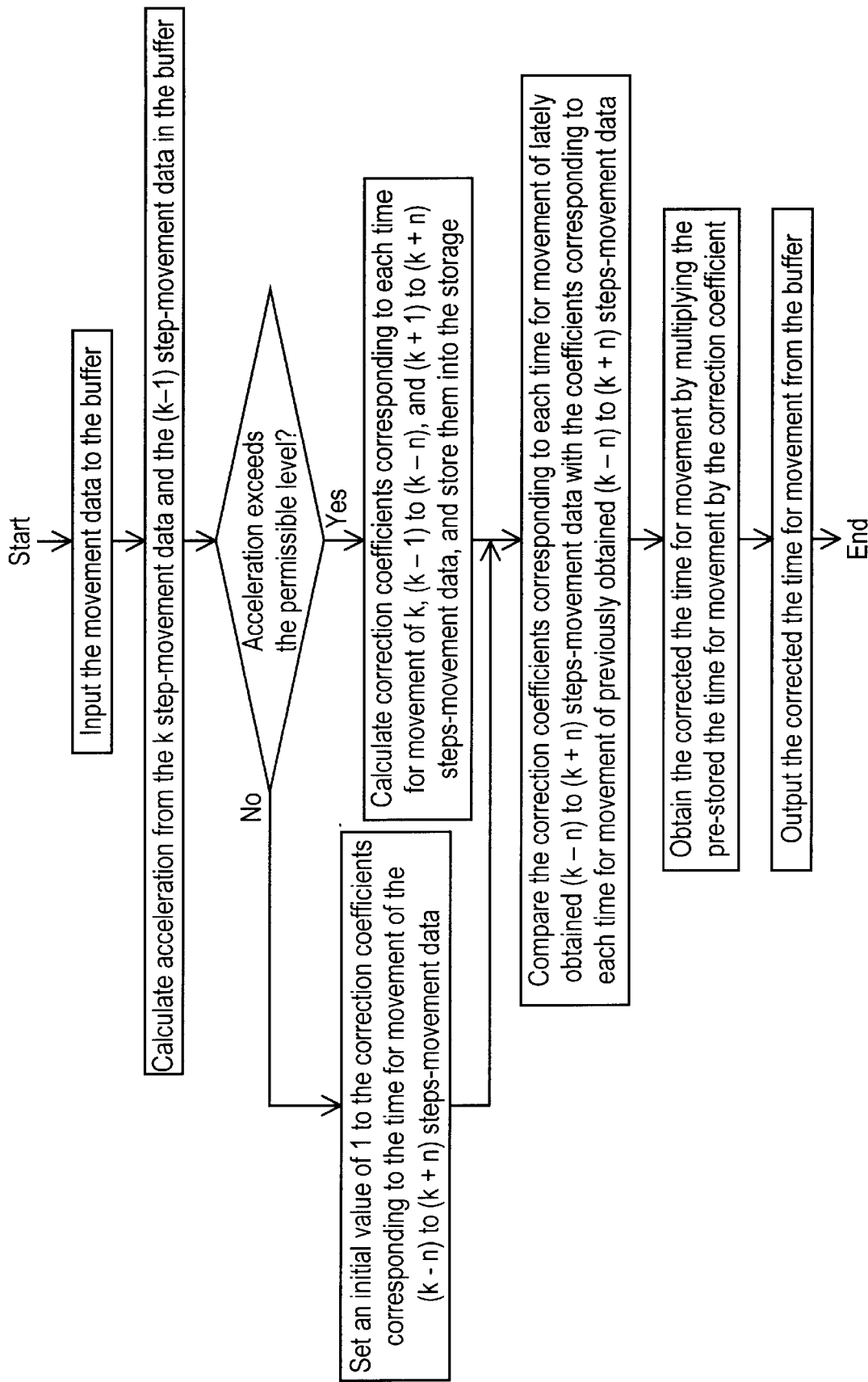
FIG. 8 is a flow chart indicating the routine of a controlling method in accordance with the fourth preferred embodiment.

FIG. 7 is a block diagram of a robot controller in accordance with the fourth preferred embodiment. The explanation of the embodiment will be given with reference to FIG. 7 and a flow chart shown in FIG. 8.

Compared to the structure of the third preferred embodiment, the structure of the embodiment differs in that calculator 9; first correction-coefficient storage 10; second correction-coefficient storage 11; and comparators 20 through 28 are disposed.

In the first process of the calculation, calculator 9 and coefficient storage 10 function the same as the calculator 6 and storage 7, respectively, of the third preferred embodiment: calculator 9 extensively calculates from correction coefficient β(k−n) to coefficient β(k+n); where n takes on 1 to 4. Storage 10 stores the correction coefficients handed from calculator 9. In the buffer of storage 11, the initial value of 1 is given to the storage area for correction coefficient β(k+4). Following the calculation of the correction coefficients, each of comparators 20 through 28 compares a coefficient stored in storage 10 and one step before-calculated coefficient in storage 11. Each comparator chooses greater one as a valid coefficient and put it back to storage 11. Storage 11 outputs the coefficients in sequence to calculator 4, where the movement data is corrected.

The calculation process described above lessens variations in velocity of the joint axes moving with an unacceptable acceleration for an extended period.

It further lessens variations in velocity of the joint axes to dispose still another storage for storing two steps before-calculated correction coefficients and to select the smallest one of the three.

Although calculator 9 not only calculates from correction coefficients β(k−n) to β(k+n), but also performs the calculation similar to that done by calculator 2 in the first preferred embodiment, it is not limited to: the structure may contain another calculator that takes on the task of calculator 2.

In the embodiments, Storage devices 1, 3, 7, 10, and 11 are formed of: semiconductor storage devices including a flash memory; magnetic storage devices including a hard disk; or magneto-optic storage devices including a magneto-optic disk. On the other hand, calculators 2, 4, 5, 6, 9 and comparators 20 through 28 are formed of microcomputers. The devices shown in the embodiments can be differently structured: ideas on hardware design allow some devices selected from the embodiments to be formed into one structure; or allow a single device to be multi-functioned.

Although the embodiments have consistently explained that storage 1 handles two movement data by using the same storage area—pre-correction data is replaced with post-correction data, it is not limited to: the structure may contain another storage device dedicated to storing post-correction movement data.

What is claimed is:

1. A robot controller comprising:
    (a) a first storage unit for storing movement data which includes an amount of movement of a robot and an amount of time for movement of said robot; and
    (b) a calculator for determining whether or not the movement data stored in the first storage unit will cause said movement of said robot with over acceleration exceeding a predetermined level; if the determining shows said over-acceleration, the calculator generates a) a correction for the movement data reasonable for the over-acceleration at a present step of movement and b) corrections for movement data for steps preceding and following said present step of movement; and
    (c) second calculator for correcting the movement data responsible for the over-acceleration, the preceding and the following movement data to the movement data so that each time for movement is increased, if the calculation by the first calculator indicates the over-acceleration,
    wherein the second calculator provides a degree of increase in the time for movement to the preceding and the following movement data lower than a degree of increase in the time for movement provided to the movement data responsible for the over-acceleration.

2. The robot controller as defined in claim 1, wherein the calculator provides successively smaller corrections to movement data for steps successively preceding and successively following the present step of movement.

3. A robot controller comprising:
    (a) a first storage unit for storing movement data which includes an amount of movement of a robot and an amount of time for movement of said robot; and
    (b) a calculator for determining whether or not the movement data stored in the first storage unit will cause said movement of said robot with over acceleration exceeding a predetermined level; if the determining shows said over-acceleration, the calculator generates a) a correction for the movement data responsible for the over-acceleration at a present step of movement and b) corrections for movement data for steps preceding and following said present step of movement;
    wherein the calculator generates corrections for the amount of time of movement data at steps preceding and following the present step of movement which are less than said correction for the amount of time of movement data at the present step of movement.

4. A robot controller comprising:
    (a) a first storage unit for storing movement data which includes an amount of movement of a robot and an amount of time for movement of said robot; and
    (b) a calculator for determining whether or not the movement data stored in the first storage unit will cause said movement of said robot with over acceleration exceeding a predetermined level; if the determining shows said over-acceleration, the calculator generates a) a correction for the movement data responsible for the over-acceleration at a present step of movement and b)

corrections for movement data for steps preceding and following said present step of movement;

wherein the calculator compares a) corrections generated for the present step of movement and for steps preceding and following the present step of movement; with b) corrections generated for a further step of movement following the present step of movement and for steps preceding and following said further step;

and applies the larger of each of said respective corrections to said movement data.

5. A method of controlling a robot, said method comprising the steps of:

storing movement data which includes an amount of movement of said robot and an amount of time for movement of said robot;

determining whether or not the movement data will cause said movement of said robot with over acceleration exceeding a predetermined level; and generating a) a correction for the movement data responsible for the over-acceleration at the present step of movement and b) corrections for movement data for steps preceding and following said present step of movement if the determining shows said over-acceleration wherein the corrections are generated for the amount of time of movement data at steps preceding and following the present step of movement which are less than said correction for the amount of time of movement data at the present step of movement.

6. A method of controlling a robot, said method comprising the steps of:

storing movement data which includes an amount of movement of said robot and an amount of time for movement of said robot;

determining whether or not the movement data will cause said movement of said robot with over acceleration exceeding a predetermined level; and generating a) a correction for the movement data responsible for the over-acceleration at the present step of movement and b) corrections for movement data for steps preceding and following said present step of movement if the determining shows said over-acceleration wherein successively smaller corrections are provided to movement data for steps successively preceding and successively following the present step of movement.

7. A method of controlling a robot, said method comprising the steps of:

storing movement data which includes an amount of movement of said robot and an amount of time for movement of said robot;

determining whether or not the movement data will cause said movement of said robot with over acceleration exceeding a predetermined level; and generating a) a correction for the movement data responsible for the over-acceleration at the present step of movement and b) corrections for movement data for steps preceding and following said present step of movement if the determining shows said over-acceleration wherein corrections generated for the present step of movement and for steps preceding and following the present step of movement are compared with corrections generated for a further step of movement following the present step of movement and for steps preceding and following said further steps and the larger of each of said respective corrections are applied to the movement data.

* * * * *

UNITED STATES PATENT AND TRADEMARK OFFICE
CERTIFICATE OF CORRECTION

PATENT NO. : 6,684,131 B2
DATED : January 27, 2004
INVENTOR(S) : Hashimoto et al.

It is certified that error appears in the above-identified patent and that said Letters Patent is hereby corrected as shown below:

Title page,
Item [56], References Cited, U.S. PATENT DOCUMENTS, "6,386,116 11/2002 Ostwald et al." should read -- 6,386,116 5/2002 Ostwald et al. --.

Column 6,
Line 23, before "second" insert -- a --.

Signed and Sealed this

Thirteenth Day of July, 2004

JON W. DUDAS
*Acting Director of the United States Patent and Trademark Office*